United States Patent
Miura

(10) Patent No.: US 9,671,773 B2
(45) Date of Patent: Jun. 6, 2017

(54) NUMERICAL CONTROL SYSTEM

(71) Applicant: FANUC Corporation, Minamitsuru-gun, Yamanashi (JP)

(72) Inventor: Masahiro Miura, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 351 days.

(21) Appl. No.: 14/573,363

(22) Filed: Dec. 17, 2014

(65) Prior Publication Data

US 2015/0177725 A1 Jun. 25, 2015

(30) Foreign Application Priority Data

Dec. 25, 2013 (JP) ................................. 2013-267115

(51) Int. Cl.
  *G05B 19/18* (2006.01)
  *H04L 12/28* (2006.01)
  (Continued)

(52) U.S. Cl.
  CPC ........... *G05B 19/18* (2013.01); *G05B 19/414* (2013.01); *G06F 13/00* (2013.01); *G06F 13/36* (2013.01); *G06F 13/368* (2013.01); *G06F 13/38* (2013.01); *G06F 13/4247* (2013.01); *H02P 29/00* (2013.01); *H04L 7/00* (2013.01); *H04L 12/00* (2013.01); *H04L 12/28* (2013.01); *H04L 12/40058* (2013.01); *H04L 12/423* (2013.01); *H04L 12/52* (2013.01); *H04L 12/54* (2013.01);
  (Continued)

(58) Field of Classification Search
  None
  See application file for complete search history.

(56) References Cited

U.S. PATENT DOCUMENTS 5,850,338 A * 12/1998 Fujishima .......... G05B 19/4145
  700/3
6,430,634 B1 * 8/2002 Mito .................... G05B 19/042
  710/100

(Continued)

FOREIGN PATENT DOCUMENTS

CN 1826767 A 8/2006
CN 101316160 A 12/2008
(Continued)

OTHER PUBLICATIONS

'Smartmotor Numeric Control—Quick Tutorial' copyright 2002 by Animatics Corporation.*
(Continued)

*Primary Examiner* — Steven Snyder
(74) *Attorney, Agent, or Firm* — Drinker Biddle & Reath LLP

(57) ABSTRACT

In a numerical control system in which a numerical controller is connected with a plurality of amplifiers via a daisy-chain serial bus, these amplifiers are grouped into a first group and a second group, and connected in an order of the amplifiers of the first group and the amplifiers of the second group from the numerical controller. Further, a communication cycle in the communication between the numerical controller and the amplifiers of the second group is set n times (n is an integer of 2 or larger) as large as a communication cycle of the first group.

2 Claims, 4 Drawing Sheets

(51) Int. Cl.
*H04L 7/00* (2006.01)
*H04L 12/54* (2013.01)
*H02P 29/00* (2016.01)
*H04L 12/423* (2006.01)
*H04L 12/00* (2006.01)
*G06F 13/42* (2006.01)
*G06F 13/36* (2006.01)
*G06F 13/38* (2006.01)
*H04L 12/52* (2006.01)
*G06F 13/368* (2006.01)
*G06F 13/00* (2006.01)
*H04L 12/40* (2006.01)
*G05B 19/414* (2006.01)

(52) U.S. Cl.
CPC .... *H04L 12/56* (2013.01); *G05B 2219/33226* (2013.01)

(56) References Cited

U.S. PATENT DOCUMENTS

| | | | | |
|---|---|---|---|---|
| 7,038,418 | B2 * | 5/2006 | Noda | G05B 19/4144 318/567 |
| 7,092,618 | B2 * | 8/2006 | Yoshio | G11B 20/12 386/231 |
| 2001/0024447 | A1 * | 9/2001 | Yoshio | G11B 20/12 370/421 |
| 2004/0041533 | A1 * | 3/2004 | Noda | G05B 19/4144 318/569 |
| 2006/0251046 | A1 | 11/2006 | Fujiwara | |
| 2007/0159125 | A1 * | 7/2007 | Aoyama | G05B 19/414 318/569 |
| 2016/0209827 | A1 * | 7/2016 | Baba | G05B 19/402 |

FOREIGN PATENT DOCUMENTS

| | | | |
|---|---|---|---|
| CN | 101459581 A | 6/2009 | |
| JP | EP 0788041 A1 * | 8/1997 | ............ G05B 19/19 |
| JP | H11-231915 A | 8/1999 | |
| JP | 2002-319942 A | 10/2002 | |
| JP | EP 1394644 A1 * | 3/2004 | ......... H05B 19/4144 |
| JP | 2004-227261 A | 8/2004 | |
| JP | 2004-289754 A | 10/2004 | |
| JP | 2008-067562 A | 3/2008 | |

OTHER PUBLICATIONS

Notification of the First Office Action issued Oct. 9, 2016 in Chinese Patent Application No. 2014108292722 (5 pages) with an English Translation (7 pages).

Notification of Reasons for Refusal dated May 12, 2015, along with its English-language translation, in corresponding Japanese Patent Application 2013-267115.

* cited by examiner

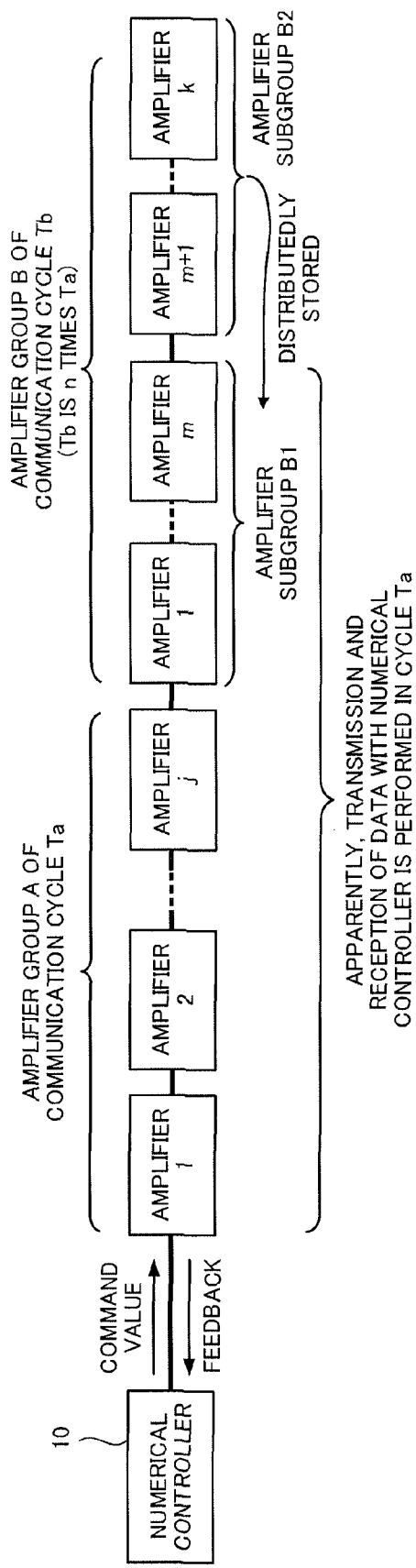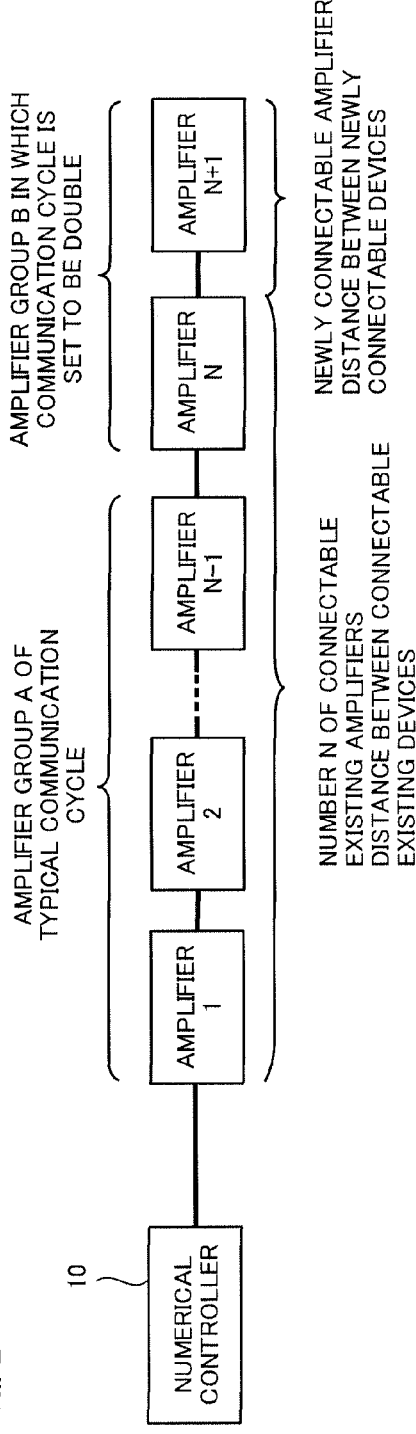

NOTE) SC: START CODE

NOTE) SC: START CODE

NUMERICAL CONTROL SYSTEM

RELATED APPLICATION DATA

This application claims priority under 35 U.S.C. §119 and/or §365 to Japanese Application No. 2013-267115 filed Dec. 25, 2013, the entire contents is incorporated herein by reference.

BACKGROUND OF THE INVENTION

1. Field of the Invention

The present invention relates to a numerical control system capable of appropriately controlling communication with communication devices and efficiently using a communication band.

2. Description of the Related Art

FIG. 6 is a block diagram illustrating a numerical control system according to a related art. FIG. 7 is a block diagram illustrating an example of transmission from a numerical controller to amplifiers in the numerical control system according to the related art. As illustrated in FIG. 7, in the numerical control system according to the related art, in communication from the numerical controller 10 to an amplifier, a numerical controller 10 transmits transmission data to all amplifiers in each communication cycle. Further, as illustrated in FIG. 8, in the numerical control system according to the related art, in communication from the amplifier to the numerical controller 10, all the amplifiers transmit transmission data to the numerical controller in each communication cycle.

In an industrial network, it is important to guarantee that communication is necessarily executed (punctuality) within a certain communication period of time. As the punctuality is guaranteed, a network can be applied to an application in which a strict real time property such as synchronous control of motion control is required. In a numerical control system in which the punctuality is guaranteed, a communication period of time, a communication cycle, the number of communication devices, a communication data amount, a distance between communication devices, and the like are specifically decided and managed.

For example, IEEE1394 serving as an international standard, but isochronous transfer is specified as a method of guaranteeing punctuality of real-time data in which it is problematic if a reproduction operation stops in the middle of reproduction such as an image or a sound (see Japanese Patent Application Laid-Open No. 2002-319942). Specifically, a transfer band is divided into isochronous transfer and non-isochronous transfer in a time division manner, and a decided amount of data is transferred to a decided number of devices during a period of time allocated to the isochronous transfer.

In the related art, in communication in which punctuality is guaranteed, since a communication period of time, a communication cycle, the number of communication devices, a communication data amount, a distance between communication devices, and the like are specifically decided and managed, there is no flexibility in a communication system. As described above, in the communication scheme of the related art, the punctuality is secured in communication between the numerical controller and the amplifier, but since communication cycles are uniformly decided, even when there is an amplifier that can be controlled even in a slow communication cycle, it is necessary to adjust a communication specification according to an amplifier that desires a fastest communication cycle. As a result, the number of connectable amplifiers is limited, and if it is simply assumed that the numerical controller performs direct communication with the amplifiers via a serial bus in a one-on-one manner, and there is neither delay in a communication path nor circuit delay caused as a communication packet passes through each amplifier, the following inequality holds:

$$T \times R > N \times B$$

Thus, $N < T \times R / B$,

Here, T (s) indicates a communication cycle,
R (bps) indicates an effective communication rate,
N indicates the number of amplifiers, and
B (bit) indicates a communication amount per amplifier.

Further, transmission and reception data amount of serial communication is equal to transmission and reception data amount of all amplifiers.

In a system in which a communication rate of serial communication and a communication amount per amplifier are already decided, a communication cycle is in inverse proportion to the number of connectable amplifiers.

As described above, when there is an amplifier that desires a fast communication cycle and a serial communication cycle is made fast according to the amplifier, the number of connectable amplifiers is reduced.

SUMMARY OF THE INVENTION

In this regard, in light of the problems of the related art, it is an object of the present invention to provide a numerical control system which is capable of appropriately controlling communication with communication devices and efficiently using a communication band since there are many communication devices that desire punctuality but have a lax communication purpose, for example, do not care about a lengthy communication cycle or a small communication data amount.

In a numerical control system according to a first aspect of the present invention, a numerical controller and a plurality of units are connected via a daisy-chain serial bus, and transmission from the numerical controller to the plurality of units is performed via the serial bus and transmission from the plurality of units to the numerical controller is performed via the serial bus. The plurality of units are grouped into a first group and a second group, and are connected in an order of the units of the first group and the units of the second group from the numerical controller. And a communication cycle in the communication between the numerical controller and the units of the second group is set n times (n is an integer of 2 or larger) as large as a communication cycle in the communication between the numerical controller and the units of the first group.

Among the units of the second group, a certain number of units close to the numerical controller may be classified into a second group first subgroup and the remaining units may be classified into a second group second subgroup, and the units of the second group first subgroup may receive and store signals transmitted from the units of the second group second subgroup toward the numerical controller, and may select the stored signals or signals of the units of the second group first subgroup, and may transmit the selected signals to the numerical controller in each communication cycle of the first group.

The units may be amplifiers each driving and controlling a motor or an IO unit that transfers a DI/DO signal.

In a numerical control system according to a second aspect of the present invention, a numerical controller and a plurality of amplifiers are connected via a daisy-chain serial bus, each of the plurality of amplifiers drives a motor based on a command of a certain cycle transmitted from the numerical controller via the serial bus, and feedback data on the command is transmitted to the numerical controller via the serial bus. The plurality of amplifiers are grouped into a first group and a second group, and are connected in an order of the amplifiers of the first group and the amplifiers of the second group from the numerical controller. And a communication cycle in the communication between the numerical controller and the units of the second group is set n times (n is an integer of 2 or larger) as large as a communication cycle in the communication between the numerical controller and the units of the first group.

Among the amplifiers of the second group, a certain number of amplifiers close to the numerical controller may be classified into a second group first subgroup, and the remaining amplifiers may be classified into a second group second subgroup, and the amplifiers of the second group first subgroup may receive and store feedback data transmitted from the amplifiers of the second group second subgroup toward the numerical controller, and may select the stored feedback data or feedback data of the amplifiers of the second group first subgroup, and may transmit the selected feedback data to the numerical controller in each communication cycle of the first group.

According to the present invention, in a numerical control system in which punctuality is guaranteed, communication with a machine to which a long communication cycle is allowable is carried out in a cycle that is n times as large as a typical cycle (n is an integer of 2 or larger). Thus, it is possible to provide a numerical control system capable of increasing the number of communication devices and a total line length of a communication line without influencing communication with other communication devices.

BRIEF DESCRIPTION OF THE DRAWINGS

The above and other objects and features of the present invention will become more apparent by describing the following embodiment with reference to the appended drawings in which:

FIG. 1 is a block diagram illustrating a numerical control system according to a first embodiment of the present invention;

FIG. 2 is a block diagram illustrating a numerical control system according to a second embodiment of the present invention;

DETAILED DESCRIPTION OF THE PREFERRED EMBODIMENTS

Figure 3:
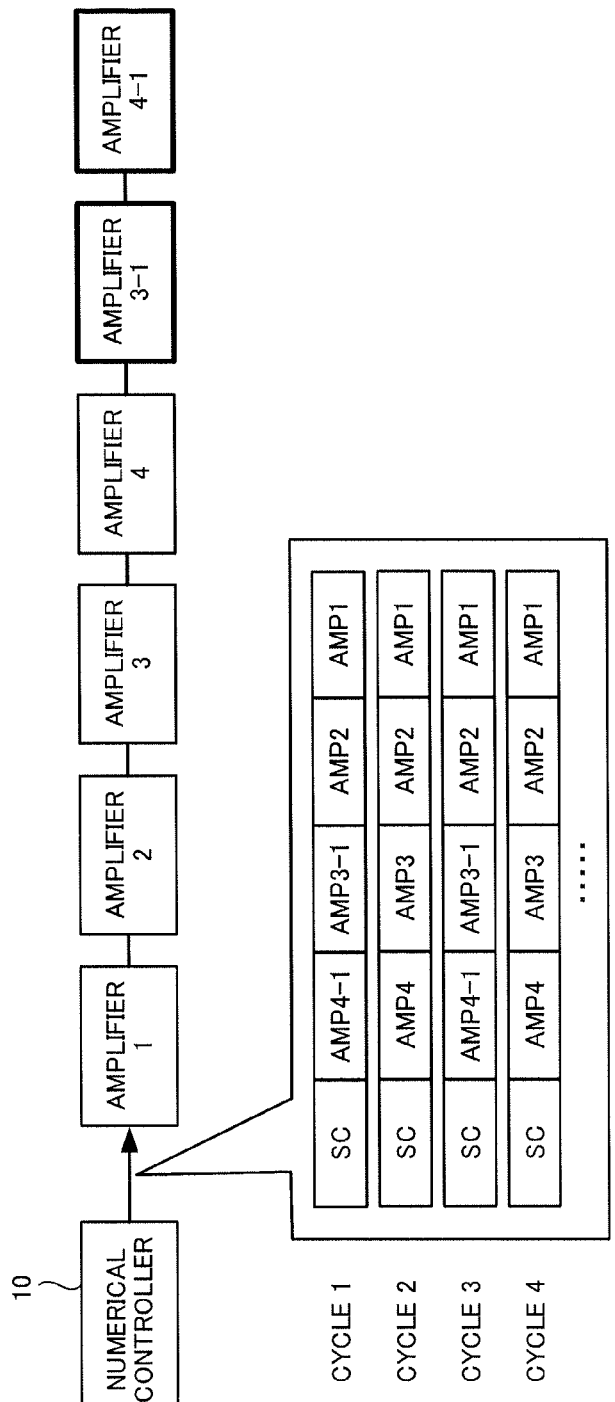
FIG. 3 is a diagram illustrating an example of transmission from a numerical controller to an amplifier in a numerical control system according to the present invention.

FIG. 1 is a block diagram illustrating a numerical control system according to a first embodiment of the present invention.

The numerical controller 10 transmits a command value of a position, a speed, torque, or an electric current to each amplifier that drives and controls each motor equipped in a machine body, and receives feedback on a position, a speed, torque, or an electric current from each amplifier. In FIG. 1, a "command value" indicates a command value of a position, a speed, torque, or an electric current, and "feedback" indicates feedback on a position, a speed, torque, or an electric current.

In the numerical control system of FIG. 1, an amplifier group A includes j amplifiers 1 to j, an amplifier group B includes k amplifiers 1 to k, and the numerical controller 10 is connected with the amplifier group A including the j amplifiers and the amplifier group B including the k amplifiers via a daisy-chain serial bus in the order illustrated in FIG. 1. A communication cycle Tb in which transmission and reception are performed between the numerical controller 10 and the amplifier group B is n times (n is an integer of 2 or larger) as large as a communication cycle Ta in which transmission and reception are performed between the numerical controller 10 and the amplifier group A.

In other words, a command is transmitted from the numerical controller 10 to the amplifiers through data transmission of the cycle Ta to the amplifier group A and data transmission of the cycle Tb (=Ta×n) to the amplifier group B. Meanwhile, similarly, feedback is transmitted from the amplifiers to the numerical controller 10 through data transmission of the cycle Ta from the amplifier group A and data transmission of the cycle Tb (=Ta×n) from the amplifier group B. At this time, among the amplifiers included in the amplifier group B, one or more amplifiers included in a cluster of m amplifiers (an amplifier subgroup B1 including m amplifiers, that is, amplifiers 1 to m) closest to the numerical controller 10 in the daisy-chain is configured to store transmission data transmitted from the amplifiers (an amplifier subgroup B2 including amplifiers (m+1) to k) at the subsequent stage and transmit the stored transmission data together with transmission data of their own in the cycle Ta. Here, m is assumed to be larger than k÷2 (m>k÷2).

The amplifier subgroup B1 performs transmission and reception with the numerical controller 10 on the communication line in the same cycle (Ta) as the group A, and from a point of view of a communication capability, the amplifiers of the group A and the group B1 can be connected to this communication line up to a limit of the number of amplifiers that allows to perform transmission and reception in the cycle Ta. In addition, the (k−m) amplifiers excluding the group B1 among the amplifier group B, amplifier subgroup B2, are connected to this communication line, and it is possible to increase the number of amplifiers that can be connected to the communication line without completely changing the communication specification of the amplifiers group A.

FIG. 2 is a block diagram illustrating a numerical control system according to a second embodiment of the present invention.

In the numerical control system according to this embodiment, a communication cycle of one of N amplifiers is set to be double, and one amplifier is newly added. In other words, a total line length of a system is increased such that a communication cycle of one (an amplifier N) of predetermined N connectable amplifies (amplifiers 1 to N) is set to be double, and another amplifier (an amplifier (N+1) having the same communication cycle (double the communication cycle) as the amplifier N is connectable. Since the communication band of the amplifier N of the related art is shared between the amplifier N and added another amplifier N+1, there is no influence on the amplifiers (the amplifiers 1 to N−1) other than the amplifier N.

<Transmission from Numerical Controller 10 to Amplifiers>

FIG. 3 is a diagram illustrating an example of transmission from the numerical controller 10 to the amplifiers in the numerical control system according to the present invention.

In the example of FIG. 3, a communication protocol in which transmission data transmitted to all amplifiers are included in one packet is assumed. Further, assumed is a communication system in which the number of connectable amplifiers is 4 in the related art, whereas among the 4 amplifiers (the amplifiers 1 to 4), the transfer cycles of the amplifier 3 and the amplifier 4 are set to be double, as a result, two amplifiers (amplifiers 3-1 and 4-1) are connectable.

In consequence, in the example of the numerical control system of FIG. 3, the communication band used for communication of the numerical controller 10 and the amplifiers 3 and 4 in the related art is alternately used by the amplifier 3 and the amplifier 3-1 or the amplifier 4 and the amplifier 4-1. Even when the numerical control system of FIG. 3 is used instead of the numerical control system of the related art including the four amplifiers, there is no influence on communication between numerical controller 10 and the amplifier 1 and communication between the numerical controller 10 and the amplifier 2 at all.

Figure 4:
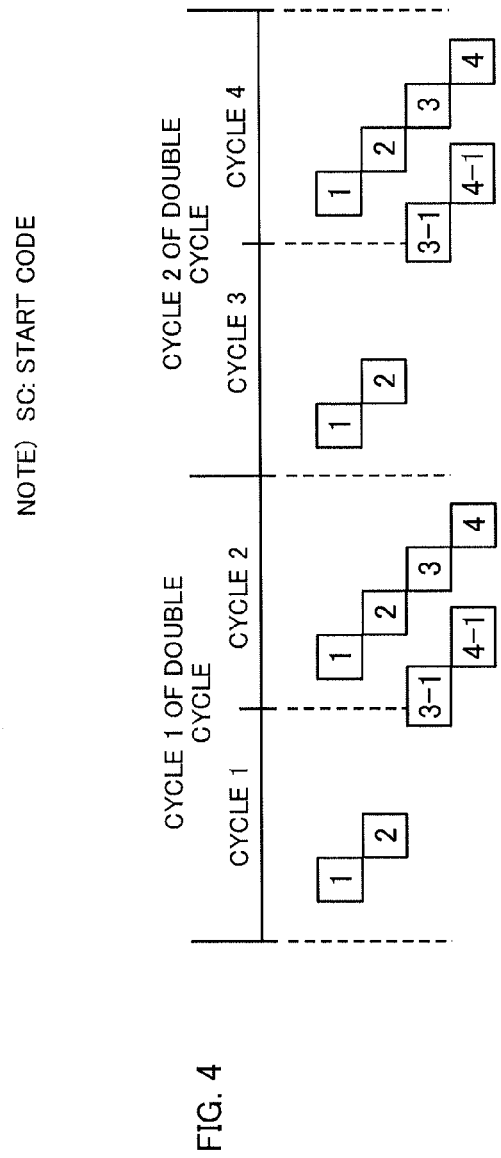
FIG. 4 is a diagram illustrating an example of reception timing of transmission data transmitted from a numerical controller to an amplifier in the numerical control system of FIG. 3.

FIG. 4 is a diagram illustrating an example of an amplifier side reception timing of transmission data from the numerical controller 10 to the amplifiers in the numerical control system of FIG. 3 (a start code is omitted).

Since there is a delay according to a line length or a delay in a circuit at the time of passing through amplifiers until a packet arrives at each amplifier, an arrival time of an amplifier distant from the numerical controller 10 is delayed.

Figure 7:
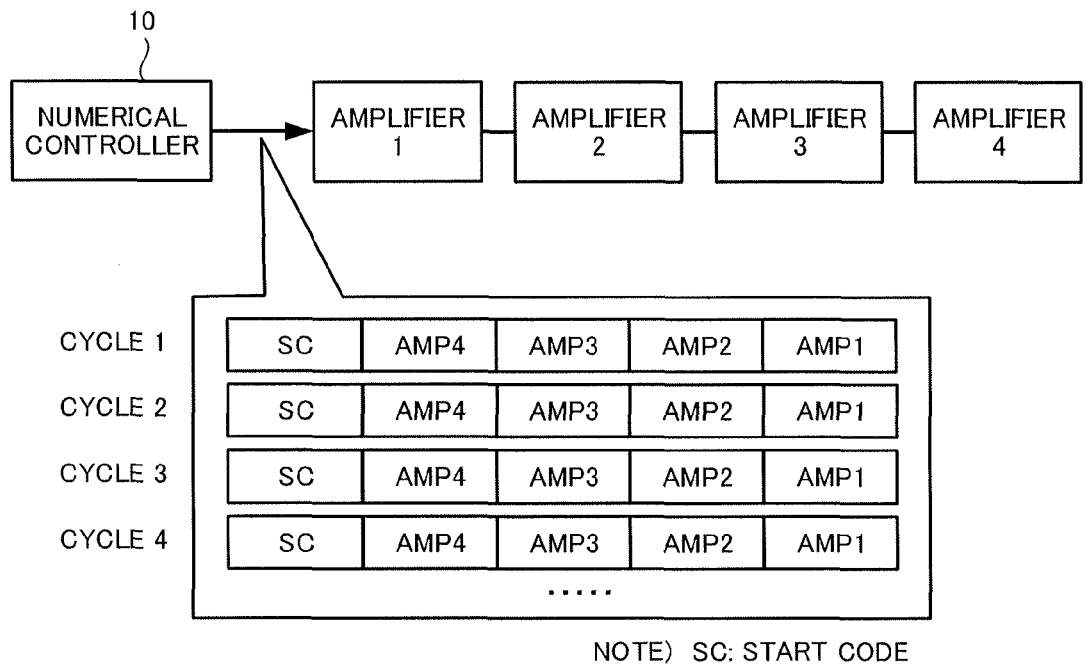
FIG. 7 is a block diagram illustrating an example of transmission from a numerical controller to an amplifier in the numerical control system according to the related art.
Figure 8:
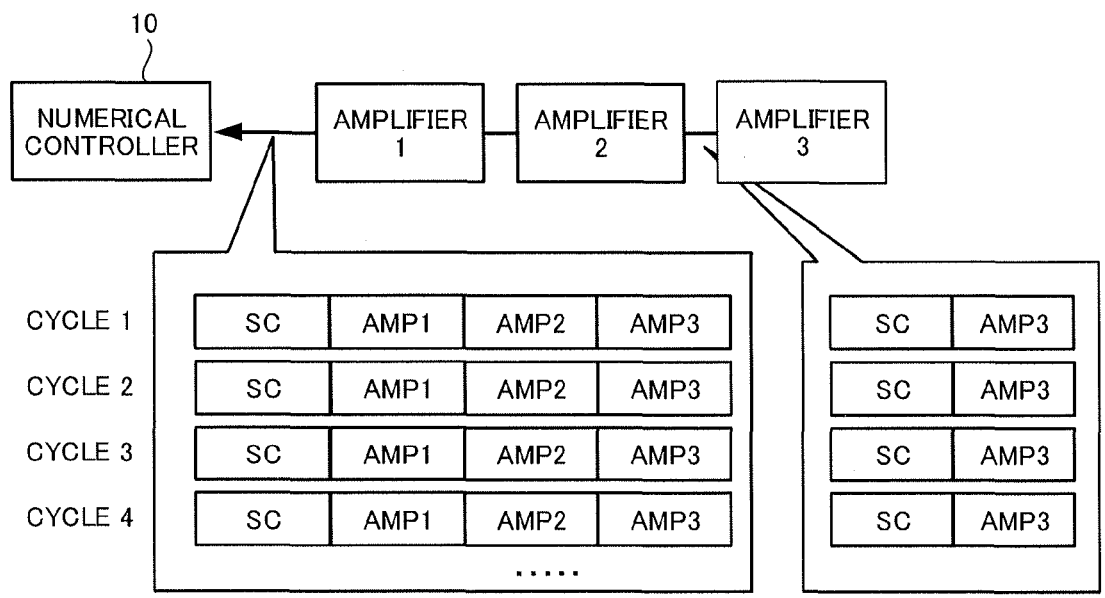
FIG. 8 is a diagram illustrating an example of transmission from an amplifier to a numerical controller in the numerical control system according to the related art.

In the system configuration of the related art illustrated in FIG. 7, since a maximum of the number of connectable amplifiers is assumed to be 4, up to 4 amplifiers are guaranteed to be able to perform reception within a cycle as in a "cycle 2" of FIG. 4. Meanwhile, the configuration of the numerical control system of the present invention illustrated in FIG. 3, the amplifier 3-1 and the amplifier 4-1 are added, and the reception timings of the amplifier 3-1 and the amplifier 4-1 may be included in the next cycle as in a "cycle 1" of FIG. 4. Similarly, even when the number of amplifiers is increased and a total line length of the system is increased, the amplifier 3-1 and the amplifier 4-1 can perform reception within a "cycle 1 of double cycle," and the punctuality is maintained in the double cycle.

<Transmission from Amplifiers to the Numerical Controller 10>

Figure 5:
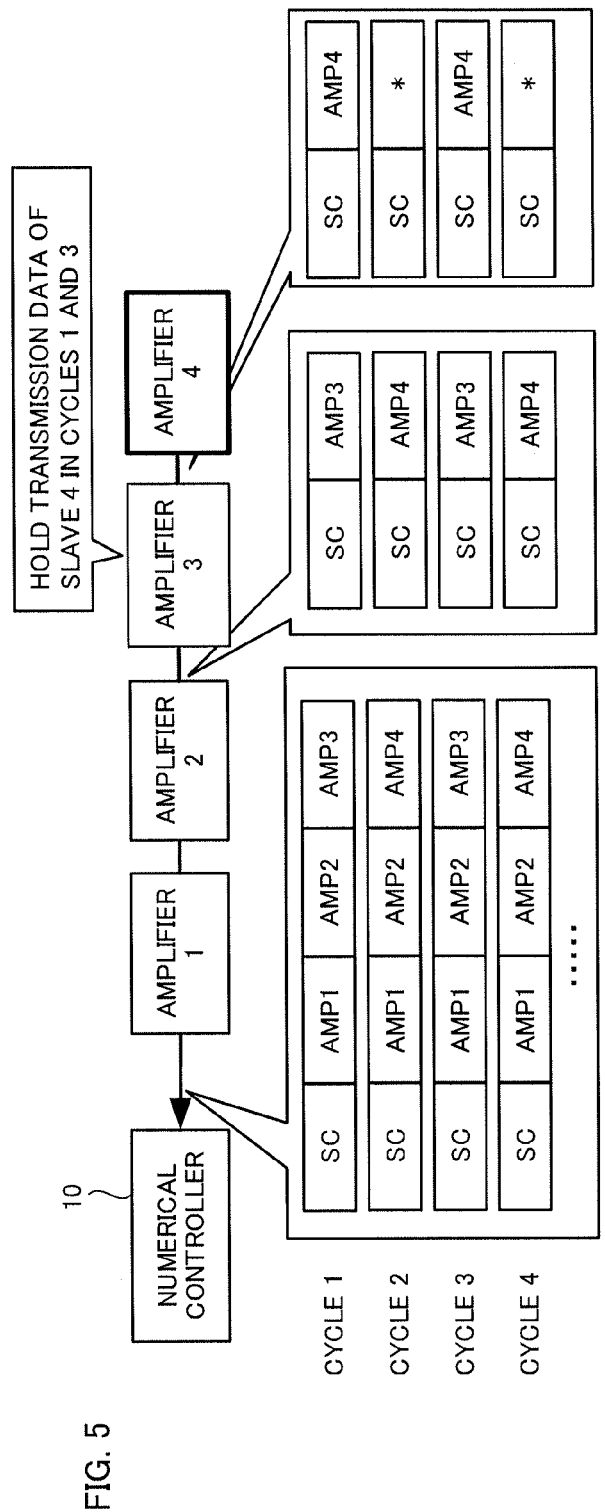
FIG. 5 is a diagram illustrating an example of transmission from an amplifier to a numerical controller in a numerical control system according to the present invention.
Figure 6:
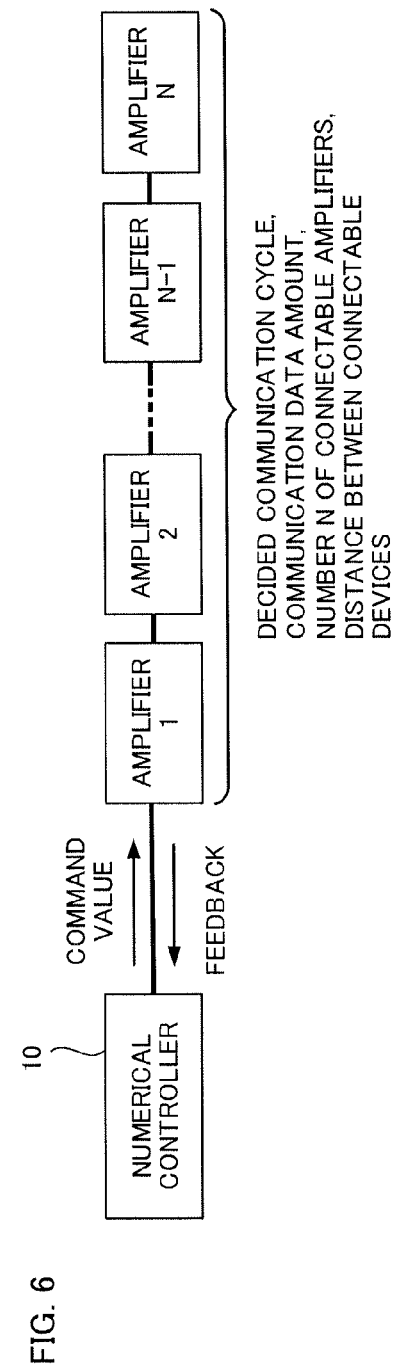
FIG. 6 is a block diagram illustrating a numerical control system according to a related art.

FIG. 5 is a diagram illustrating an example of transmission from the amplifiers to the numerical controller 10 in the numerical control system according to the present invention.

In the example of FIG. 5, similarly to the numerical control system of FIG. 3, a communication protocol in which transmission data transmitted to all amplifiers are included in one packet is assumed. Further, assumed is a communication system in which the number of connectable amplifiers is 3 in the related art, whereas among the 3 amplifiers (the amplifiers 1 to 3), the transfer cycles of the amplifier 3 is set to be double, and one amplifier (an amplifier 4) is connectable.

In the numerical control system illustrated in FIG. 5, it is determined whether the amplifier 3 transmits its own data (data of the amplifier 3) based on a current cycle number or transmits data of the amplifier 4. In other words, the amplifier 3 serves to organize its own transfer and the transfer of the amplifier 4. Since transfer data of the amplifier 4 is transferred to and held in the amplifier 3 in a "cycle 1" and a "cycle 3," the amplifier 3 can transmit the transfer data of the amplifier 4 in a "cycle 2" and a "cycle 4."

In communication in which the punctuality is guaranteed, since a communication delay between the numerical controller 10 and a slave at a farthest end has to be within a communication cycle in view of a delay in a circuit or a delay caused by a line length, when a communication cycle of the system is decided, a maximum of the number of connectable amplifiers and a maximum of a total line length are decided.

In the case of the numerical control system of FIG. 5, the number of connectable amplifiers is assumed to be 3 in the related art, therefore the number of amplifiers in which the punctuality is guaranteed is 3. In other words, when the amplifier 4 is simply added, data transmitted by the amplifier 4 is not guaranteed to reach the numerical controller 10 in the same cycle, and if data transmitted by the amplifier 4 does not reach the numerical controller 10 in the same cycle, its transmission timing extends to the next cycle, as a result, there is a possibility that the transmission timing of data transmitted by the amplifier 4 competes against a transmission timing of data transmitted by another amplifier in the next cycle. On the other hand, in the example of the numerical control system of FIG. 5, data transmitted by the amplifier 4 is first held in the amplifier 3 during the "cycle 1," and then transmitted by the amplifier 3 in the "cycle 2", therefore the transmission timing of data transmitted by the amplifier 4 does not compete against a transmission timing of data transmitted by another amplifier.

As described above, in the communication from the amplifiers to the numerical controller 10, even when an amplifier is added, and the total line length is increased, the punctuality of N times the cycle is secured. Further, even when the numerical control system of FIG. 5 is used instead of the numerical control system of the related art including three amplifiers, there is no influence on communication between the numerical controller 10 and the amplifier 1 and communication between the numerical controller 10 and the amplifier 2 at all.

Further, a configuration in which a plurality of units (IO units) for external signal input and output is employed between the numerical controller 10 and a machine tool (not illustrated) in order to receive and output a DI/DO signal (an input signal/output signal), and the DI/DO signal is usually transferred between the numerical controller 10 and the IO units. The present invention can be applied to a system in which a plurality of IO units, instead of amplifiers, are connected to the numerical controller 10 in the daisy-chain manner.

The invention claimed is:

1. A numerical control system in which a numerical controller and a plurality of units are connected via a daisy-chain serial bus, and transmission from the numerical controller to the plurality of units is performed via the serial bus and transmission from the plurality of units to the numerical controller is performed via the serial bus, wherein
 the plurality of units are grouped into a first group and a second group, the units of the first group being closer to the numerical controller relative to the units of the second group, and
 a communication cycle in the communication between the numerical controller and the units of the second group is set n times (n is an integer of 2 or larger) as large as a communication cycle in the communication between the numerical controller and the units of the first group, and wherein
 among the units of the second group, a certain number of units is classified into a second group first subgroup, and the remaining units of the second group are classified into a second group second subgroup, the second group first subgroup being closer to the numerical controller relative to the second group second subgroup, and
 the units of the second group first subgroup receive and store signals transmitted from the units of the second group second subgroup toward the numerical controller, and select the stored signals or signals of the units of the second group first subgroup, and transmit the selected signals to the numerical controller in each communication cycle of the first group.

2. A numerical control system in which a numerical controller and a plurality of amplifiers are connected via a daisy-chain serial bus, each of the plurality of amplifiers drives a motor based on a command of a certain cycle transmitted from the numerical controller via the serial bus, and feedback data on the command is transmitted to the numerical controller via the serial bus, wherein
 the plurality of amplifiers are grouped into a first group and a second group, the amplifiers of the first group being closer to the numerical controller relative to the amplifiers of the second group, and
 a communication cycle in the communication between the numerical controller and the units of the second group is set n times (n is an integer of 2 or larger) as large as a communication cycle in the communication between the numerical controller and the units of the first group, and wherein
 among the amplifiers of the second group, a certain number of amplifiers is classified into a second group first subgroup, and the remaining amplifiers of the second group are classified into a second group second subgroup, the second group first subgroup being closer to the numerical controller relative to the second group second subgroup, and
 the amplifiers of the second group first subgroup receive and store feedback data transmitted from the amplifiers of the second group second subgroup toward the numerical controller, and select the stored feedback data or feedback data of the amplifiers of the second group first subgroup, and transmit the selected feedback data to the numerical controller in each communication cycle of the first group.

* * * * *